United States Patent [19]

Glaser et al.

[11] Patent Number: 4,475,824
[45] Date of Patent: Oct. 9, 1984

[54] BEARING FOIL STIFFENER

[75] Inventors: Jerry Glaser, Playa Del Rey; Henry A. Sirridge, Palos Verdes Peninsula; Ernest J. Ibach, Los Angeles, all of Calif.

[73] Assignee: The Garrett Corporation, Los Angeles, Calif.

[21] Appl. No.: 394,378

[22] Filed: Jul. 1, 1982

[51] Int. Cl.³ .............................................. F16C 32/06
[52] U.S. Cl. .................................................... 384/306
[58] Field of Search ................. 384/99, 100, 103, 104, 384/105, 107, 106, 114, 119, 124, 125, 215

[56] References Cited

U.S. PATENT DOCUMENTS

| | | | |
|---|---|---|---|
| 3,366,427 | 1/1968 | Silver et al. | 308/121 |
| 3,375,046 | 3/1968 | Marley | 308/164 |
| 3,382,014 | 5/1968 | Marley | 308/9 |
| 3,467,451 | 9/1969 | Marley | 384/215 |
| 3,511,544 | 5/1970 | Marley | 308/3 |
| 3,615,121 | 10/1971 | Barnett et al. | 308/9 |
| 3,747,997 | 7/1973 | Winn | 308/9 |
| 3,809,443 | 5/1974 | Cherubim | 308/9 |
| 3,893,733 | 7/1975 | Silver et al. | 308/9 |
| 4,133,585 | 1/1979 | Licht | 384/103 |
| 4,153,315 | 5/1979 | Silver et al. | 308/9 |
| 4,178,046 | 12/1979 | Silver et al. | 308/9 |
| 4,208,076 | 6/1980 | Gray et al. | 384/105 |
| 4,262,975 | 4/1981 | Heshmat et al. | 308/9 |

FOREIGN PATENT DOCUMENTS 2747399  4/1979  Fed. Rep. of Germany ...... 384/119

Primary Examiner—Stuart S. Levy
Assistant Examiner—David Werner
Attorney, Agent, or Firm—A. J. Miller; J. H. Muetterties

[57] ABSTRACT

A fluid bearing having a pair of members in relatively rotatable relationship with each other, and a compliant foil bearing disposed between the pair of relatively rotatable members. The compliant foil bearing has a plurality of overlapping integral compliant foil/stiffener elements with one end mounted to one of the rotatable members.

25 Claims, 11 Drawing Figures

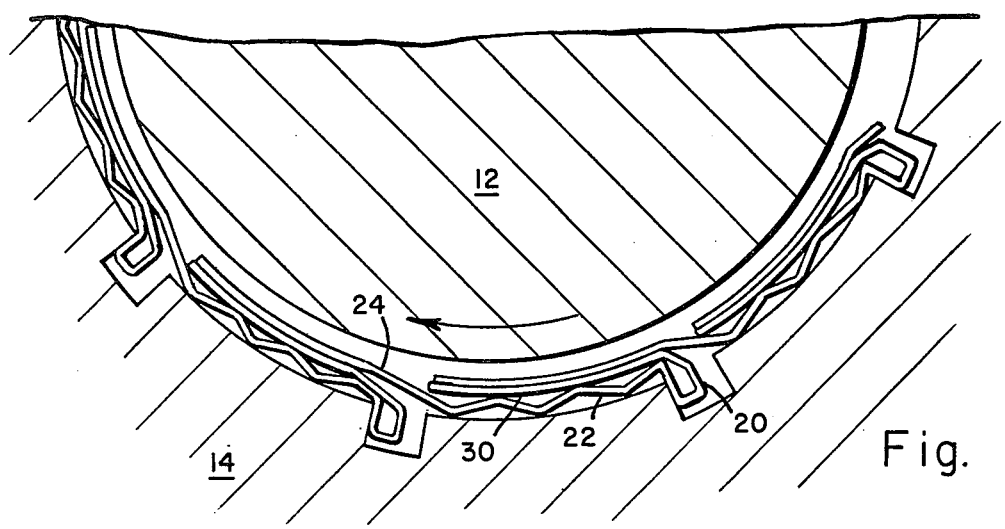
Fig. 4
Fig. 5.
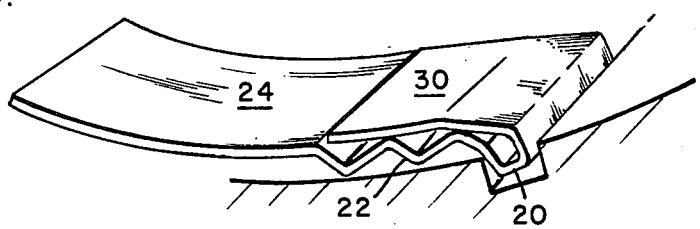
Fig. 6.
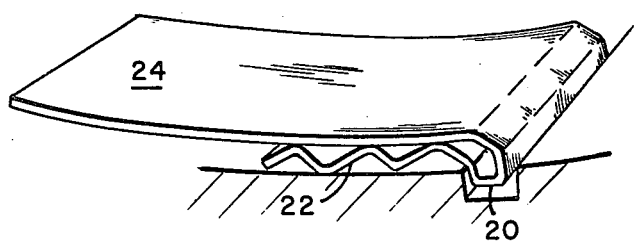
Fig. 11.
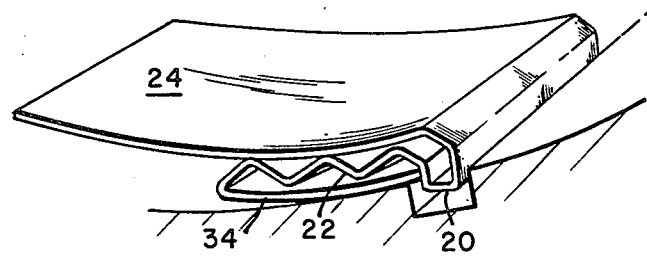
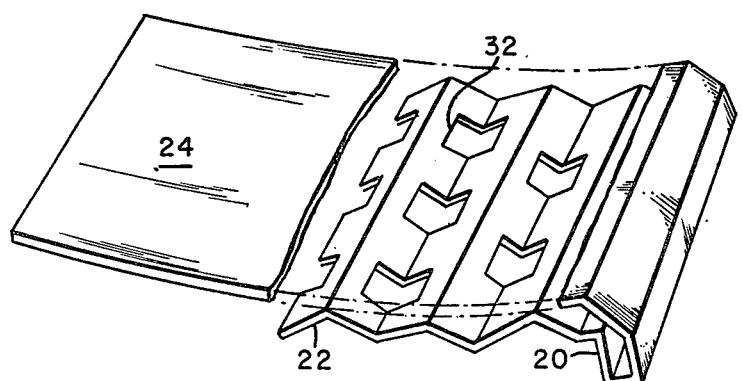
Fig. 7.

BEARING FOIL STIFFENER

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions forms a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements, a number of mounting means have been devised. The most common practice, as exemplified in U.S. Pat. Nos. 3,366,427, 3,375,046 and 3,615,121, is to attach a rod or bar to one end of the foil which can then be retained in a slot or groove in one of the relatively movable bearing elements. Alternately, as exemplified in U.S. Pat. Nos. 3,382,014 and 3,809,433, a plurality of overlapping foils may be individually mounted on a foil base such as by spot welds. The base would then be frictionally held against one of the relatively movable bearing elements. Individual foil may also be fastened directly to one of the movable bearing elements as illustrated in U.S. Pat. No. 4,262,975. Further, a lip or projection at one end of the foil may be restrained in a slot or groove in one of the relatively movable elements. Examples of this type of mounting can be found in U.S. Pat. Nos. 3,511,544, 3,747,997, 3,809,443 and 3,382,014. Individual foils have also been mounted intermediate the ends thereof as described in U.S. Pat. No. 4,178,046.

In order to establish stability of the foils in most of these prior mounting means, a substantial pre-load is required on the foil. That is, the individual foils must be loaded against the relatively movable bearing element opposed to the bearing element upon which the foils are mounted. It has been conventional to provide separate compliant stiffener elements or underfoils beneath the foil elements to supply this required pre-load as exemplified in U.S. Pat. Nos. 3,893,733 and 4,153,315.

SUMMARY OF THE INVENTION

In the present invention, the end mounted compliant bearing foil and foil stiffener are made integral with each other such that a single piece foil/stiffener element is provided. A number of variations of the end-mounted integral foil/stiffener are described. While each provides a number of specific advantages, the single piece foil/stiffener basically results in a simplified construction and mounting when compared to prior separate foil and stiffener combinations.

BRIEF DESCRIPTION OF THE DRAWINGS

FIG. 4 is an enlarged transverse cross-sectional view of an alternative integral end-mounted foil/stiffener;

FIG. 5 is an enlarged plan view of a single integral end-mounted foil/stiffener of FIG. 4;

FIG. 6 is an enlarged plan view of an alternate integral end-mounted foil/stiffener;

FIG. 7 is an enlarged plan view, partially cut away, of a modified integral end-mounted foil/stiffener of FIG. 6;

FIG. 11 is an enlarged plan view of yet another alternate integral end-mounted foil/stiffener.

DESCRIPTION OF THE PREFERRED EMBODIMENTS

Figure 1:
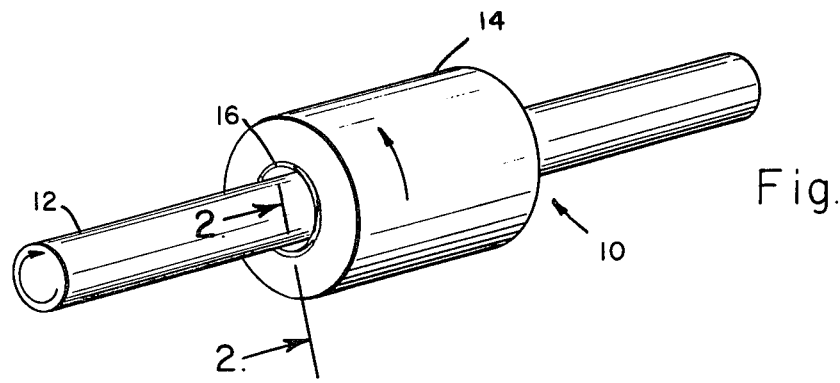
FIG. 1 is a perspective view of a foil journal bearing including the integral end-mounted foil/stiffener.

Referring now to FIG. 1, there is illustrated a foil journal bearing 10 having a shaft 12 rotatably disposed with respect to a bushing 14. Disposed between the shaft 12 and bushing 14 are a plurality of individual foil/stiffener elements 16. Arrows on the end of the shaft 12 and the exterior of the bushing 14 indicate a direction of relative rotation between the shaft and the bushing. It is not necessary however that both the shaft and the bushing rotate; one of the shaft or the bushing may be stationary. It is only necessary that the relative rotation between the shaft and the bushing be in the direction so indicated.

Figure 2:
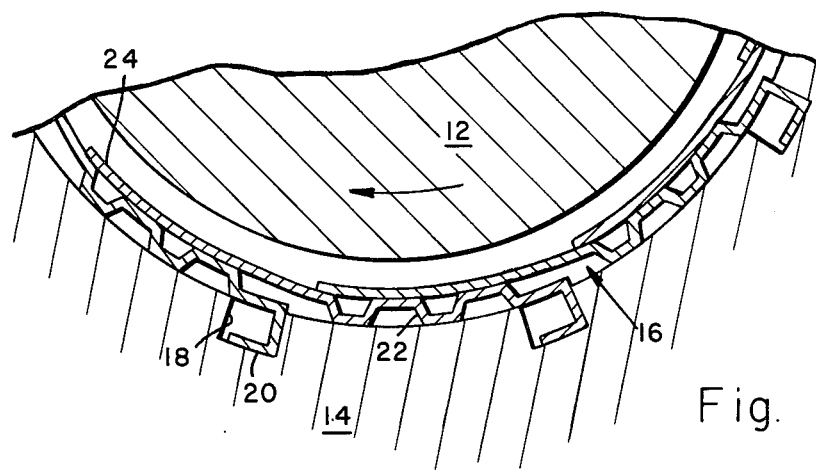
FIG. 2 is an enlarged transverse cross-sectional view of the foil journal bearing of FIG. 1 taken along line 2—2.

As is more clearly illustrated in FIG. 2, the individual foil/stiffener elements 16 are mounted in slots 18 in the bushing 14. Extending from the mounting end 20, the elements 16 comprise a stiffener or stiffening portion 22 and a foil or foil portion 24, with the foil 24 overlapping the stiffener 22 of the next adjacent element 16 as illustrated in FIG. 2. The stiffener 22, shown as undulating, may in fact be wavy or having alternating ridges and grooves. It is only important that it provide a spring-like pre-load underneath the foil 24 which overlays it. While the mounting end 20 of the element 16 is shown in FIG. 2 as generally L-shaped, the stiffener 22 may be attached to a bar 26 which can be inserted into the slot 18 as shown in FIG. 3.

Figure 3:
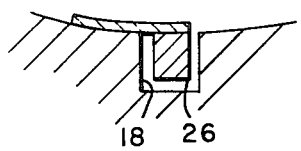
FIG. 3 is an enlarged fragmentary view of the integral end-mounted foil-stiffener of FIG. 2 showing an alternative mounting arrangement.

While the integral end-mounted compliant foil/stiffener illustrated in FIGS. 2 and 3 is by far the simplest of such an integration, there are many variations which are possible, some of which are illustrated in the following figures. FIGS. 4 and 5, for example, show an underfoil 30 which overlays the stiffener 22 at the mounting end 20 of the element 16 which also includes foil 24 extending from the stiffener 22. The foil 24 of the element 16 overlays the underfoil 30 of the next adjacent element 16 as illustrated in FIG. 4. The underfoil 30 is shown as integral with the stiffener 22 at the mounting end 20 of the element 16. In this manner the element can be formed in a single piece construction. As with respect to the embodiment of FIGS. 2 and 3 and also with respect to certain of the embodiments which follow, alternate mounting means, such as the bar 26 of FIG. 3, can be utilized.

Figure 9:
FIGS. 8, 9, and 10 are schematic diagrams of other alternate integral end-mounted foil/stiffeners.
Figure 8:
Figure 10:

In the embodiment of FIG. 6, both the foil 24 and the stiffener 22 extend in the same direction from the end mounting 20, with the stiffener 22 disposed underneath the foil 24. The free end of the foil 24 would overlap the mounting end of the next adjacent element 16. The stiffener 22, as shown in FIG. 7, may include cut out portions 32 to effectively change the spring rate thereof. FIGS. 8, 9, and 10 illustrate three alternate stiffening portion arrangements, each with differing spring rates.

A further alternative integral end-mounted foil/stiffener embodiment is illustrated in FIG. 11. In this arrangement, as in those shown in FIGS. 6–10, both the foil 24 and the stiffener 22 extend in the same direction from the end mounting 20. The free end of the stiffener 22 is, however, folded back underneath itself toward the end mounting 20 to form a compliant underfoil 34.

By providing an integral foil/stiffener, whether extending in series from the end mounting or where both extend in overlapping fashion in the same direction from the end mounting, a simplied construction, having ease of manufacture, is set forth.

While a number of specific embodiments of this invention have been illustrated and described, it is to be understood that these are provided by way of example only and that the invention is not to be construed as being limited thereto but only by the proper scope of the following claims.

We claim:

1. A hydrodynamic fluid bearing comprising:
   a bearing support member having an opening therein;
   a rotatable shaft operably disposed within the opening of said bearing support member; and
   a plurality of compliant, overlapping, integral foil/stiffener elements operably mounted within the opening in said bearing support member around said rotatable shaft, each of said plurality of integral foil/stiffener elements having first a stiffener and then a foil in series extending from the end mounting thereof and an integral underfoil extending in parallel with the stiffener from the end mounting thereof and overlaying the stiffener.

2. The hydrodynamic fluid bearing of claim 1, wherein said stiffener is a waveform.

3. A hydrodynamic fluid bearing comprising:
   a bearing support member having an opening therein;
   a rotatable shaft operably disposed within the opening of said bearing support member; and
   a plurality of compliant, overlapping integral foil/stiffener elements operably mounted within the opening in said bearing support member around said rotatable shaft, each of said plurality of integral foil/stiffener elements having a stiffener and a foil both extending in parallel from the end mounting thereof with the foil overlaying the stiffener and encompassing less than 360° of said shaft, said stiffener includes an integral underfoil extending under the stiffener towards the end mounting thereof.

4. A hydrodynamic fluid bearing comprising:
   a tubular bushing having an inner surface with a plurality of axially extending slots therein;
   a rotatable shaft operably supported within said bushing; and
   a plurality of compliant overlapping integral foil/stiffener elements disposed around said rotatable shaft and having one end thereof mounted within the slots in the inner surface of said bushing, each of said plurality of integral foil/stiffener elements including a first free end having a waveform stiffener extending from the mounting end thereof and a compliant foil extending from the waveform stiffener, and a second shorter underfoil free end extending from the mounting end thereof and overlaying the waveform stiffener of the first free end, the compliant foil overlapping the underfoil of the next adjacent integral foil/stiffener element.

5. The hydrodynamic fluid bearing of claim 4 wherein the waveform stiffener includes a plurality of cutouts to control the spring-rate thereof.

6. The hydrodynamic fluid bearing of claim 4 wherein the waveform stiffener includes a plurality of cutouts to control the spring-rate thereof.

7. A hydrodynamic fluid bearing comprising:
   a tubular bushing having an inner surface with a plurality of axially extending slots therein;
   a rotatable shaft operably supported within said bushing; and
   a plurality of compliant overlapping integral foil/stiffener elements disposed around said rotatable shaft and having one end thereof mounted within the slots in the inner surface of said bushing, each of said plurality of integral foil/stiffener elements including a compliant foil free end and a shorter waveform stiffener free end underlying a portion of the compliant foil free end, the compliant foil free end overlapping the stiffener underlain portion of the next adjacent integral foil/stiffener element and the shorter waveform stiffener free end including an underfoil extending underneath the waveform stiffener back towards the mounting end thereof.

8. The hydrodynamic fluid bearing of claim 7 wherein the waveform stiffener includes a plurality of cutouts to control the spring-rate thereof.

9. An integral foil/stiffener element for a fluid bearing comprising:
   means to mount the element in the fluid bearing;
   a stiffener extending from said mounting means, said stiffener includes an integral underfoil extending under the stiffener from the free end thereof towards said mounting means; and
   a compliant foil extending from said mounting means disposed over and beyond said stiffener, said mounting means disposed between the stiffener and the foil.

10. The hydrodynamic fluid bearing of claim 3 or 9 wherein the stiffener is waveform.

11. The hydrodynamic bearing of claim 10 wherein the waveform stiffener includes a plurality of cutouts to control the spring-rate thereof.

12. An integral foil/stiffener element for a fluid bearing comprising:

means to mount the element in the fluid bearing;
a waveform stiffener extending from said mounting means, said stiffener having at least one cutout therein to control the spring-rate thereof;
a compliant foil extending from the stiffener such that the stiffener is located between said mounting means and the foil; and
an integral underfoil adjacent to and extending from said mounting means and overlaying the stiffener.

13. An integral foil/stiffener element mountable within a fluid bearing having a tubular bushing with an inner surface with a plurality of axially extending slots therein and a rotatable shaft operably supported within said bearing comprising:
means to mount said element in one of said plurality of slots,
a stiffener extending from said mounting means, said stiffener includes an integral underfoil extending under the stiffener from the free end thereof towards the mounting means, and
a compliant foil extending from said mounting means and disposed over and beyond said stiffener.

14. A hydrodynamic fluid bearing comprising:
a tubular bushing having an inner surface with a plurality of axially extending slots therein;
a rotatable shaft operably supported within said bushing; and
a plurality of compliant overlapping integral foil/stiffener elements disposed around said rotatable shaft and having a means to mount the element within the slots, each of said plurality of integral foil/stiffener elements having a stiffener extending from the mounting means and a compliant foil extending from the stiffener, and an underfoil extending from the mounting means, and parallel to and overlapping the stiffener, the compliant foil overlapping the underfoil of the next adjacent integral foil/stiffener element.

15. A hydrodynamic fluid bearing comprising:
a tubular bushing having an inner surface with a plurality of axially extending slots therein;
a rotatable shaft operably supported within said bushing; and
a plurality of compliant overlapping integral foil/stiffener elements disposed around said rotatable shaft and having a means to mount the element within the slots, each of said plurality of integral foil/stiffener elements including a compliant foil extending from the mounting means and a stiffener extending from the mounting means and underlying a portion of the compliant foil, the compliant foil overlapping the stiffener underlain portion of the adjacent integral foil/stiffener element and an underfoil extending under the stiffener back towards the mounting end thereof.

16. A fluid bearing comprising:
a pair of members arranged for relative movement with respect to one another, one of said pair of members adapted to movably support the other; and
a compliant foil bearing operably disposed between said pair of relatively rotatable members, said compliant foil bearing having a plurality of separate, overlapping integral compliant foil/stiffener elements, each mounted at one end thereof to one of said pair of relatively movable members and each of said plurality of foil/stiffener elements having a stiffener and a foil extending in parallel from the end mounting thereof with the foil overlaying the stiffener and an integral underfoil extending under the stiffener towards the end mounting thereof.

17. The fluid bearing of claim 16 wherein said bearing is a journal bearing.

18. A fluid bearing comprising:
a pair of members arranged for relative rotation with respect to one another, one of said pair of members adapted to rotatably support the other; and
a compliant foil bearing operably disposed between said pair of relatively rotatable members, said compliant foil bearing having a plurality of separate, overlapping integral compliant foil/stiffener elements, each mounted at one end thereof to one of said pair of relatively rotatable members and each of said plurality of foil/stiffener elements having a stiffener and a foil extending in parallel from the end mounting thereof with the foil overlaying the stiffener and an integral underfoil extending under the stiffener towards the end mounting thereof.

19. The fluid bearing of claim 16 or 18 wherein said bearing is hydrodynamic.

20. The fluid bearing of claim 16 or 18 wherein said bearing is hydrostatic.

21. The fluid bearing of claim 16 or 18 wherein said stiffener is a waveform.

22. The fluid bearing of claim 21 wherein the waveform stiffener includes a plurality of cutouts to control the spring-rate thereof.

23. A fluid bearing comprising:
a pair of members arranged for relative movement with respect to one another, one of said pair of members adapted to movably support the other; and
a compliant foil bearing operably disposed between said pair of relatively movable members, said compliant foil bearing having a plurality of separate, overlapping integral compliant foil/stiffener elements, each mounted at one end thereof to one of said pair of relatively movable members, each of said integral foil/stiffener element has first a stiffener then a foil in series extending from the end mounting thereof, and each of said foil/stiffener elements including an integral underfoil extending in parallel with and in the same direction as the foil/stiffener from the end mounting thereof and overlaying the stiffener.

24. A fluid bearing comprising:
a pair of members arranged for relative rotation with respect to one another, one of said members adapted to rotatably support the other; and
a compliant foil member operably disposed between said pair of relatively rotatable members, said compliant foil bearing having a plurality of separate, overlapping integral compliant foil/stiffener elements each mounted at one end thereof to one of said pair of relatively rotatable members, said integral foil/stiffener element has first a stiffener and then a foil in series extending from the end mounting thereof, and each of said plurality of foil/stiffener elements including an integral underfoil extending in parallel with and in the same direction as the foil/stiffener from the end mounting thereof and overlaying the stiffener.

25. The fluid bearing of claim 23 or 24 wherein the stiffener is a waveform.

* * * * *